US012309126B2

(12) United States Patent
Rola

(10) Patent No.: US 12,309,126 B2
(45) Date of Patent: May 20, 2025

(54) SYSTEMS AND METHODS FOR PROTECTING USER DATA PRIVACY AGAINST ANTI-TRACKING EVASION TECHNIQUES FOR WEB TRACKERS

(71) Applicant: GEN DIGITAL INC., Tempe, AZ (US)

(72) Inventor: Iskander Sanchez Rola, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 492 days.

(21) Appl. No.: 17/487,052

(22) Filed: Sep. 28, 2021

(65) Prior Publication Data

US 2023/0097984 A1 Mar. 30, 2023

(51) Int. Cl.
*H04L 9/40* (2022.01)
*H04L 67/02* (2022.01)
*H04L 67/50* (2022.01)

(52) U.S. Cl.
CPC ...... *H04L 63/0421* (2013.01); *H04L 63/0414* (2013.01); *H04L 67/02* (2013.01); *H04L 67/535* (2022.05)

(58) Field of Classification Search
None
See application file for complete search history.

(56) References Cited

U.S. PATENT DOCUMENTS

| 11,381,596 | B1 * | 7/2022 | Sanchez | H04L 63/1475 |
| 11,528,257 | B1 * | 12/2022 | Sanchez Rola | H04L 67/146 |
| 2016/0371507 | A1 * | 12/2016 | Jakobsson | H04L 67/143 |
| 2018/0332126 | A1 * | 11/2018 | Metwalley | G06F 16/95 |
| 2019/0205971 | A1 * | 7/2019 | Deo | H04L 67/535 |
| 2019/0356623 | A1 * | 11/2019 | Everton | H04L 51/23 |

OTHER PUBLICATIONS

International Search Report and Written Opinion received for PCT Application Serial No. PCT/US2022/042185 dated Dec. 8, 2022, 14 pages.
"The CNAME of the Game: Large-scale Analysis of DNS-based Tracking Evasion", Arxiv.org, Cornell University Library, 201 Olin Library, Cornell University Ithaca, NY 14853, Mar. 5, 2021 (Mar. 5, 2021), XP081902784, pp. 1-6 and 12-15.

(Continued)

*Primary Examiner* — Esther B. Henderson
(74) *Attorney, Agent, or Firm* — Greenberg Traurig, LLP

(57) ABSTRACT

The disclosed computer-implemented method for protecting user data privacy against anti-tracking evasion techniques for web trackers may include (i) detecting hypertext markup language (HTML) associated with a website displayed in a browser application, (ii) identifying one or more elements in the HTML capable of executing web tracking code from the website, (iii) determining, based on information describing scripting programming code responsible for embedding the HTML elements in the website, a presence of a hidden web tracking script, and (iv) performing a security action that protects against a potential invasion of user data privacy by preventing the hidden web tracking script from executing the web tracking code in the browser application. Various other methods, systems, and computer-readable media are also disclosed.

20 Claims, 7 Drawing Sheets

(56) References Cited

OTHER PUBLICATIONS

Dao Ha et al: "CNAME Cloaking-Based Tracking on the Web: Characterization, Detection, and Protection", IEEE Transactions On Network and Service Management, IEEE, USA, vol. 18, No. 3, Apr. 13, 2021 (Apr. 13, 2021), pp. 3873-3888, XP011875926, DOI: 10.1109/TNSM.2021.3072874 [retrieved on Sep. 7, 2021], pp. 1-9.
Aliyeva Assel Aliyevaa@Bu Edu et al: "Oversharing Is Not Caring: How CNAME Cloaking Can Expose Your Session Cookies", Practice and Experience in Advanced Research Computing, ACMPUB27, New York, NY, USA, May 24, 2021 (May 24, 2021), pp. 123-134, XP058744334, DOI: 10.1145/3433210.3437524 ISBN: 978-1-4503-8300-4, pp. 123-128.

* cited by examiner

SYSTEMS AND METHODS FOR PROTECTING USER DATA PRIVACY AGAINST ANTI-TRACKING EVASION TECHNIQUES FOR WEB TRACKERS

BACKGROUND

Internet browsing activities, including accessing websites over enterprise and home computer networks, often include web tracking during browsing sessions that may compromise user privacy by maintaining and/or utilizing private user data. For example, content being viewed on a website by a user may include a third-party website tracker configured to store identifying information (e.g., a user's browsing history or contact information) in a browser cookie or as a fingerprint on a local storage device so that when the same content is loaded by a different website, the website tracker may continue serving the user with additional content without the user's consent.

Traditional methods for addressing unwanted web tracking include utilizing enhanced web browsers or browser extensions with anti-tracking features configured to block network requests or browser cookies utilized by web trackers that are detectable via the identification of third-party website domains. As a response to anti-tracking, web tracking companies may often utilize evasion techniques that hide previously detectable trackers by disguising third-party domains as first-party domains that are not detected by traditional methods.

SUMMARY

As will be described in greater detail below, the present disclosure describes various systems and methods for protecting user data privacy against anti-tracking evasion techniques for web trackers.

In one example, a method for protecting user data privacy against anti-tracking evasion techniques for web trackers may include (i) detecting, by one or more computing devices, hypertext markup language (HTML) associated with a website displayed in a browser application, (ii) identifying, by the one or more computing devices, one or more elements in the HTML capable of executing web tracking code from the website, (iii) determining, by the one or more computing devices and based on information describing scripting programming code responsible for embedding the HTML elements in the website, a presence of a hidden web tracking script, and (iv) performing, by the one or more computing devices, a security action that protects against a potential invasion of user data privacy by preventing the hidden web tracking script from executing the web tracking code in the browser application.

In some examples, the HTML associated with the website may be detected by (i) retrieving an HTML document that renders a currently displayed web page on the website and (ii) detecting the HTML in the HTML document. In some embodiments, the HTML capable of executing the web tracking code may be identified by identifying a script HTML element and/or by identifying an inline frame (iframe) HTML element.

In some examples, the presence of the hidden web tracking script may be determined by (i) determining that a domain associated with the scripting programming code is unrelated to a domain associated with a web page for the website and (ii) identifying the scripting programming code as the hidden web tracking script. In some embodiments, the security action may include blocking the hidden web tracking script from generating a web tracking identifier such as a web tracking cookie or a local storage identifier utilized for storing user data. Additionally or alternatively, the security action may include modifying execution of the hidden web tracking script to prevent retrieving a programming code function utilized for obtaining private user data. For example, a request for retrieving the programming code function may be replaced with a request for retrieving harmless data (e.g., an image file or a fake identifier).

In one embodiment, a system for protecting user data privacy against anti-tracking evasion techniques for web trackers may include at least one physical processor and physical memory comprising computer-executable instructions and one or more modules that, when executed by the physical processor, cause the physical processor to detect, by a detection module, HTML associated with a website displayed in a browser application, (ii) identify, by an identification module, one or more elements in the HTML capable of executing web tracking code from the website, (iii) determine, by a determining module and based on information describing scripting programming code responsible for embedding the HTML elements in the website, a presence of a hidden web tracking script, and (iv) perform, by a security module, a security action that protects against a potential invasion of user data privacy by preventing the hidden web tracking script from executing the web tracking code in the browser application.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect HTML associated with a website displayed in a browser application, (ii) identify one or more elements in the HTML capable of executing web tracking code from the website, (iii) determine, based on information describing scripting programming code responsible for embedding the HTML elements in the website, a presence of a hidden web tracking script, and (iv) perform a security action that protects against a potential invasion of user data privacy by preventing the hidden web tracking script from executing the web tracking code in the browser application.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
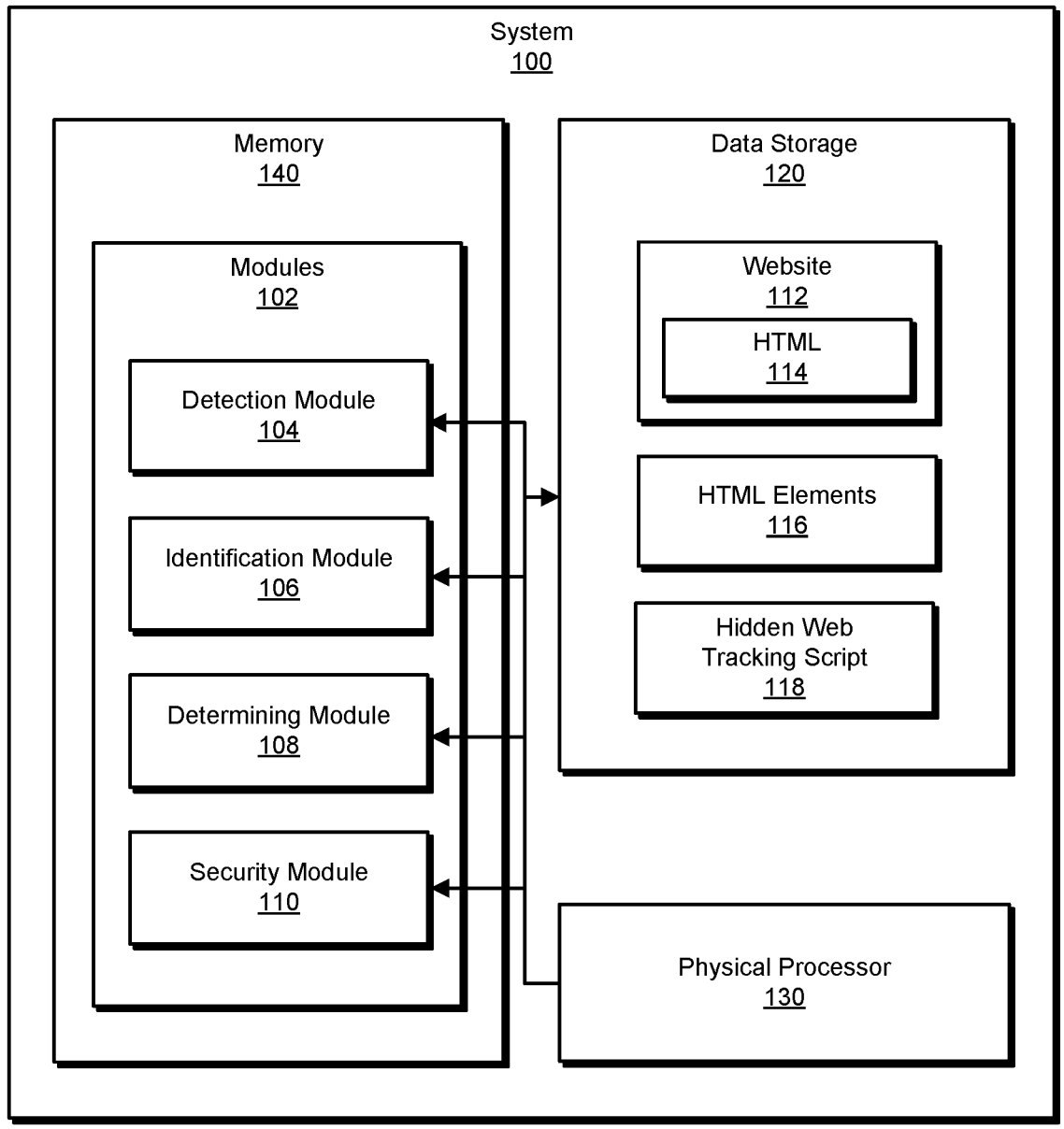
FIG. 1 is a block diagram of an example system for protecting user data privacy against anti-tracking evasion techniques for web trackers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting user data privacy against anti-tracking evasion techniques for web trackers. As will be described in greater detail herein, by performing real-time tainting (i.e., associating information about known tracking scripts with created or modified HTML elements capable of executing these scripts), the systems and methods described herein may identify and control the actions of hidden third party trackers by preventing the tracking scripts from retrieving native code that may be utilized to fingerprint users, thereby preventing the collection of data that may be used to attack a user's privacy.

In addition, the systems and methods described herein may improve computer network security by identifying website trackers running scripts intended to obtain private data (e.g., web browser cookies containing private user data) during web browsing sessions, thereby protecting against potential privacy attacks (e.g., phishing attacks) by malicious actors utilizing these website trackers.

Figure 2:
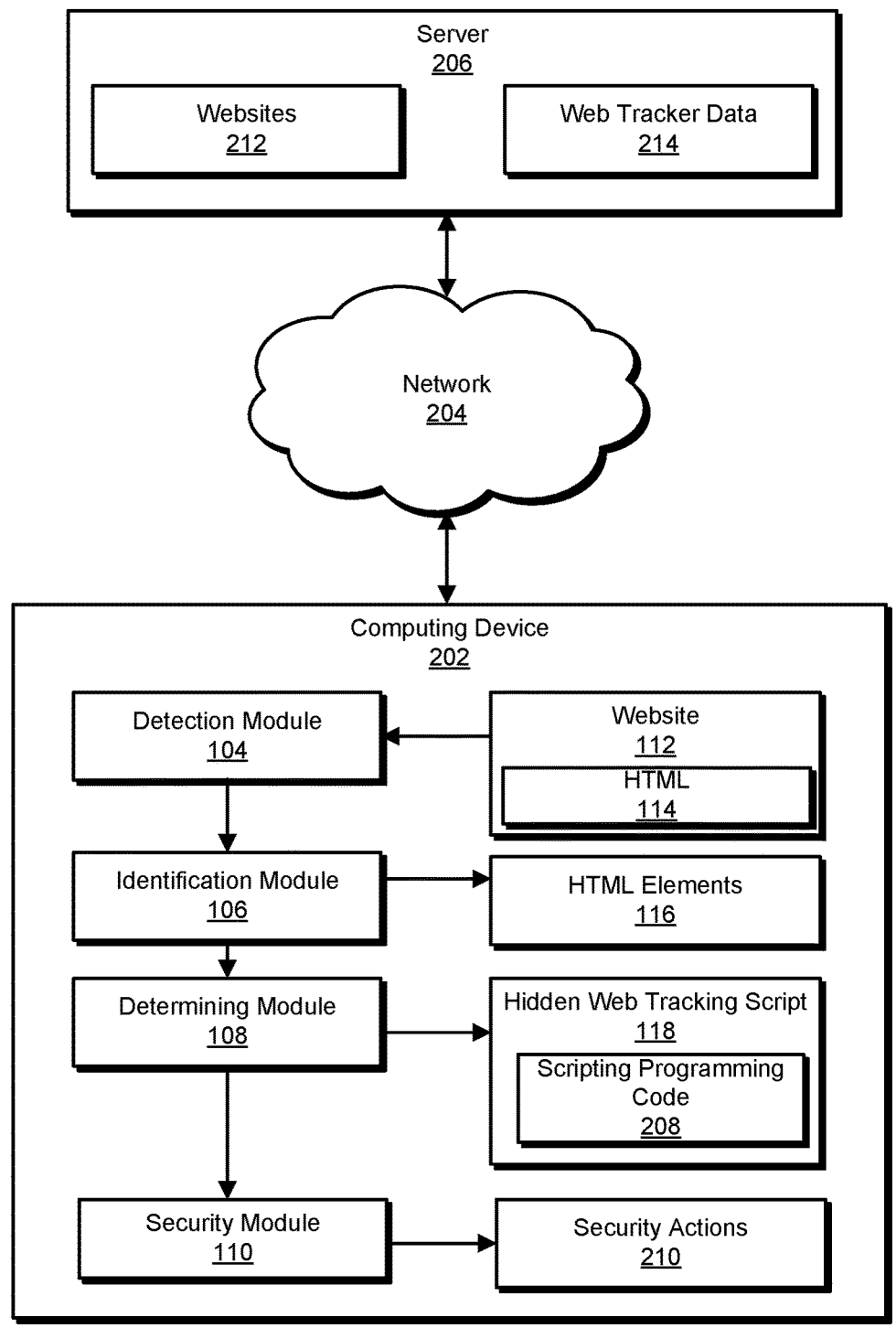
FIG. 2 is a block diagram of an additional example system for protecting user data privacy against anti-tracking evasion techniques for web trackers.

The following will provide, with reference to FIGS. 1-2, detailed descriptions of example systems for protecting user data privacy against anti-tracking evasion techniques for web trackers. Detailed descriptions of corresponding computer-implemented methods will also be provided in connection with FIG. 3. In addition, a detailed description of example HTML elements capable of containing web tracking programming code in an example system for protecting against anti-tracking evasion techniques for web trackers, will also be provided in connection with FIG. 4. In addition, a detailed description of example security actions that may be performed in an example system for protecting against anti-tracking evasion techniques for web trackers, will also be provided in connection with FIG. 5. In addition, detailed descriptions of an example computing system and network architecture capable of implementing one or more of the embodiments described herein will be provided in connection with FIGS. 6 and 7, respectively.

As illustrated in this figure, example system 100 may include one or more modules 102 for performing one or more tasks. As will be explained in greater detail below, modules 102 may include a detection module 104 that detects HTML 114 associated with a website 112. Example system 100 may additionally include an identification module 106 that identifies one or more HTML elements 116 capable of executing web tracking code from website 112. Example system 100 may also include a determining module 108 that determines, based on information describing scripting programming code responsible for embedding HTML elements 116 in website 112, a presence of a hidden web tracking script 118. Example system 100 may additionally include a security module 110 that performs security actions that protect against a potential invasion of user data privacy by preventing hidden web tracking script 118 from web tracking code. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting user data privacy against anti-tracking evasion techniques for web trackers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store website 112 including HTML 114. Data storage 120 may also store HTML elements 116 and hidden web tracking script 118.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect user data privacy against anti-tracking evasion techniques for web trackers.

For example, detection module 104 may detect HTML 114 associated with website 112. Then, identification module 106 may identify one or more HTML elements 116 capable of executing web tracking code from website 112 and or a website 212. Next, determining module 108 may determine, based on web tracker data 214 (i.e., information describing scripting programming code 208 responsible for embedding HTML elements 116 in website 112), a presence of hidden web tracking script 118. Finally, security module 110 may perform security actions 210 that protect against a potential invasion of user data privacy by preventing hidden web tracking script 118 from executing scripting programming code 208.

Computing device 202 generally represents any type or form of computing device capable of reading computer-executable instructions. In some examples, computing device 202 may be an endpoint device running client-side security software including online privacy protection in connection with user web browsing sessions. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of servicing user website requests from one or more client devices as well as storing third-party web tracker data. In some examples, each of servers 206 may represent a plurality of servers that work and/or operate in conjunction with one another. Additional examples of servers 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
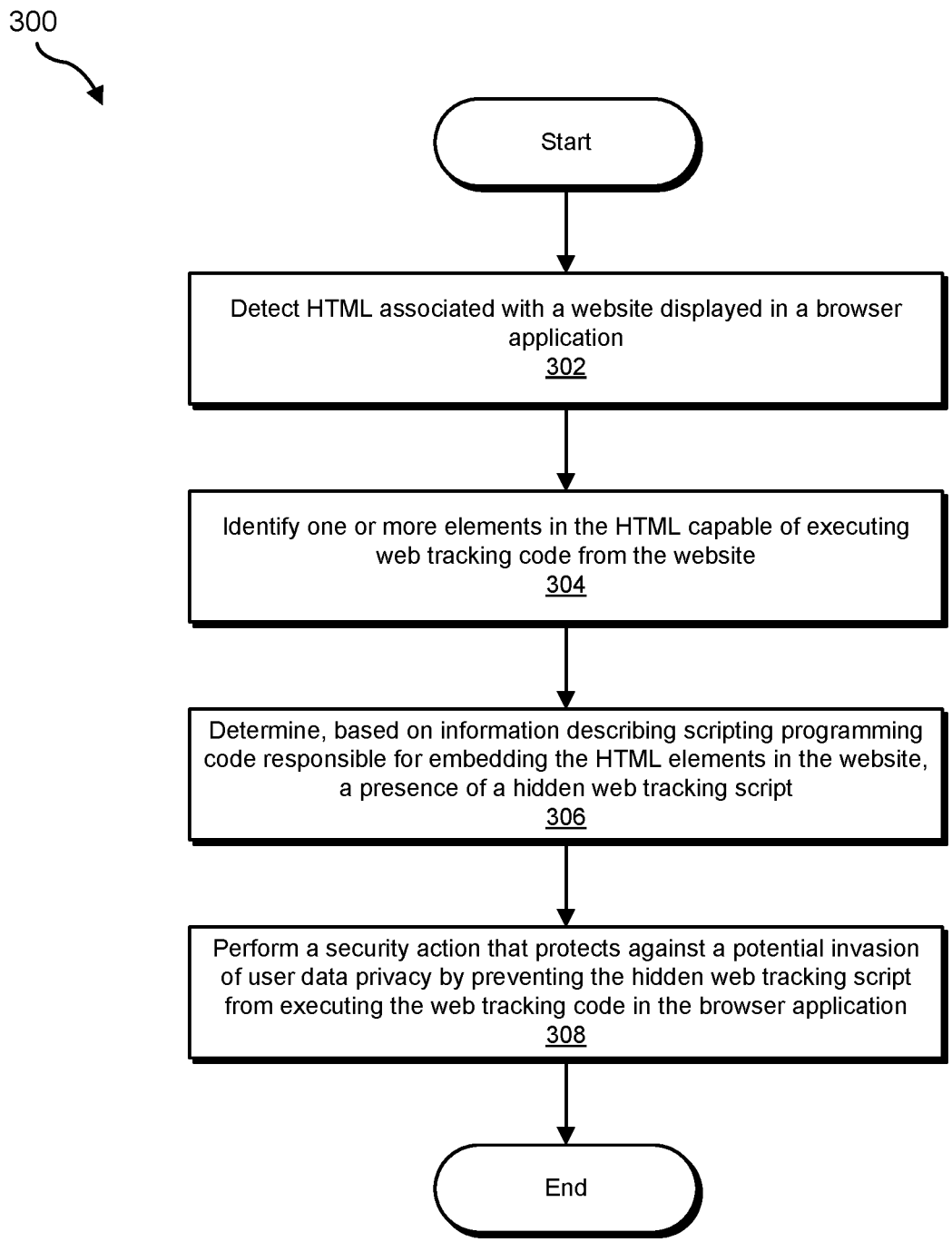
FIG. 3 is a flow diagram of an example method for protecting user data privacy against anti-tracking evasion techniques for web trackers.

FIG. 3 is a flow diagram of an example computer-implemented method 300 for protecting user data privacy against anti-tracking evasion techniques for web trackers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect HTML associated with a website displayed in a browser application. For example, detection module 104 may, as part of computing device 202 in FIG. 2, detect HTML 114 associated with website 112 that may be displayed in a browser application for a user.

Detection module 104 receive may detect HTML 114 in a variety of ways. In some embodiments, detection module 104 may retrieve an HTML document that renders a currently displayed web page on website 112 an then detect HTML 114 in the HTML document.

At step 304, one or more of the systems described herein may identify one or more elements in the HTML, detected at step 302, that is capable of executing web tracking code from the website. For example, identification module 106 may, as part of computing device 202 in FIG. 2, identify HTML elements 116 capable of executing web tracking code from website 112.

Figure 4:
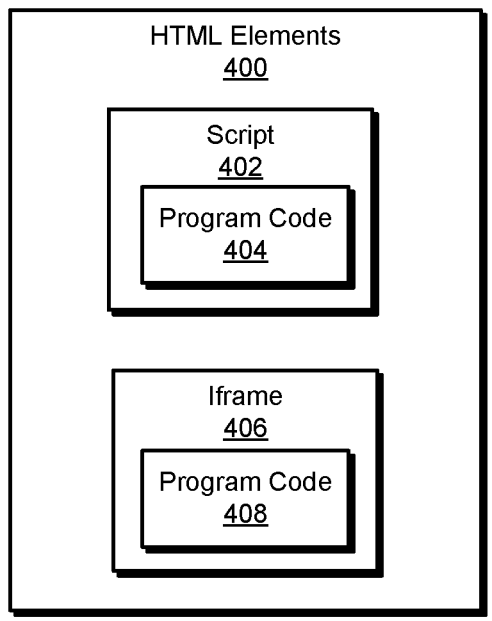
FIG. 4 is a block diagram showing example HTML elements capable of containing web tracking programming code in an example system for protecting against anti-tracking evasion techniques for web trackers.
Figure 5:
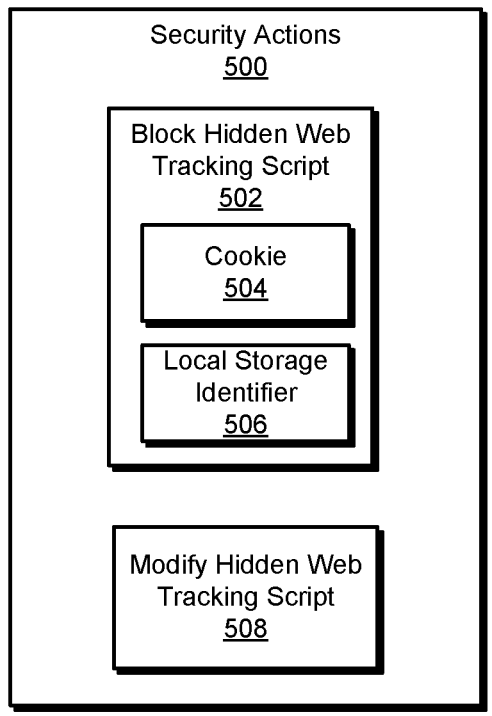
FIG. 5 is a block diagram showing example security actions that may be performed in an example system for protecting against anti-tracking evasion techniques for web trackers.

Identification module 106 may identify HTML elements 116 in a variety of ways. In some embodiments, identification module 106 may identify one or more script HTML elements (i.e., <script>) contained within HTML 114 for website 112. Additionally or alternatively, identification module may identify an Iframe HTML element (i.e., <iframe>) contained within HTML 114 for website 112. In some examples, and as shown in FIG. 4, HTML elements 400 may include a script 402 element and an iframe 406 element containing executable program code 404 and executable program code 408, respectively. Program code 404 and program code 408 may represent web tracking code (e.g., "document.createElement).

At step 306, one or more of the systems described herein may determine, based on information describing scripting programming code responsible for embedding the HTML elements in the website, a presence of a hidden web tracking script. For example, determining module 108 may, as part of computing device 202 in FIG. 2, determine, based on information describing scripting programming code 208 responsible for embedding HTML elements 116 in website 112, the presence of hidden web tracking script 118.

Determining module 108 may determine the presence of hidden web tracking script 118 in a variety of ways. In some embodiments, determining module 108 may determine that a domain associated with scripting programming code 208 is unrelated to a domain associated with a web page for website 112 and then identify scripting programming code 208 as hidden web tracking script 118. For example, determining module 108 may determine that a web tracker associated with the domain "tracker.net" embeds a script in a main web page of the website "example.com." Based on this determination, determining module 108 may identify scripting programming code for the domain "tracker.net" as a hidden web tracking script (i.e., the web tracker associated with "tracker.net" is disguising itself as "example.com" to bypass any web-browser anti-tracking solutions that may be currently implemented).

At step 308, one or more of the systems described herein may, perform a security action that protects against a potential invasion of user data privacy by preventing the hidden web tracking script from executing the web tracking code in the browser application. For example, security module 110 may, as part of computing device 202 in FIG. 2, perform one or more security actions 210 that prevent the execution of hidden web tracking script 118.

Security module 110 may perform security actions 210 in a variety of ways. For example, as shown FIG. 5, security module 110 may perform various security actions 500 including, without limitation, a block hidden web tracking script 502 action and a modify hidden web tracking script 508 action. In some embodiments, block hidden web tracking script 502 action may include preventing hidden web tracking script 118 from generating a web tracking identifier such as a cookie 504 and/or a local storage identifier 506. Additionally or alternatively, block hidden web tracking script 502 action may include preventing hidden web tracking script 118 from retrieving the native code of specific JAVASCRIPT functions utilized to fingerprint website users. For example, if hidden web tracking script 118 creates an iframe with "window.location.host" as its source, and then attempts to retrieve native function code using "iframe.contentWindow," block hidden web tracking script 502 action may stop the retrieval attempt so that hidden web tracking script 118 is unable to obtain information (i.e., private user data) that could be used to attack a user's privacy. In some embodiments, modify hidden web tracking script 508 action may include replacing a request for retrieving a programming code function with a request for retrieving harmless data. For example, if hidden web tracking script 118 attempts to send a request to retrieve JAVASCRIPT functions utilized to fingerprint website users, modify hidden web tracking script 508 action may modify this request so that harmless data (e.g., a fake identifier or an image file) is returned instead of the requested functions.

As explained in connection with method 300 above, the systems and methods described herein provide for protecting user data privacy against anti-tracking evasion techniques for web trackers. The systems and methods described herein may utilize a tainting phase to perform real-time tainting (i.e., associating information about known tracking scripts with created or modified HTML elements capable of executing these scripts). The systems and methods described herein may also utilize a control phase to identify and control the actions of hidden third-party trackers by preventing the tracking scripts from retrieving native code that may be utilized to fingerprint users, thereby preventing the collection of data that may be used to attack a user's privacy.

Figure 6:
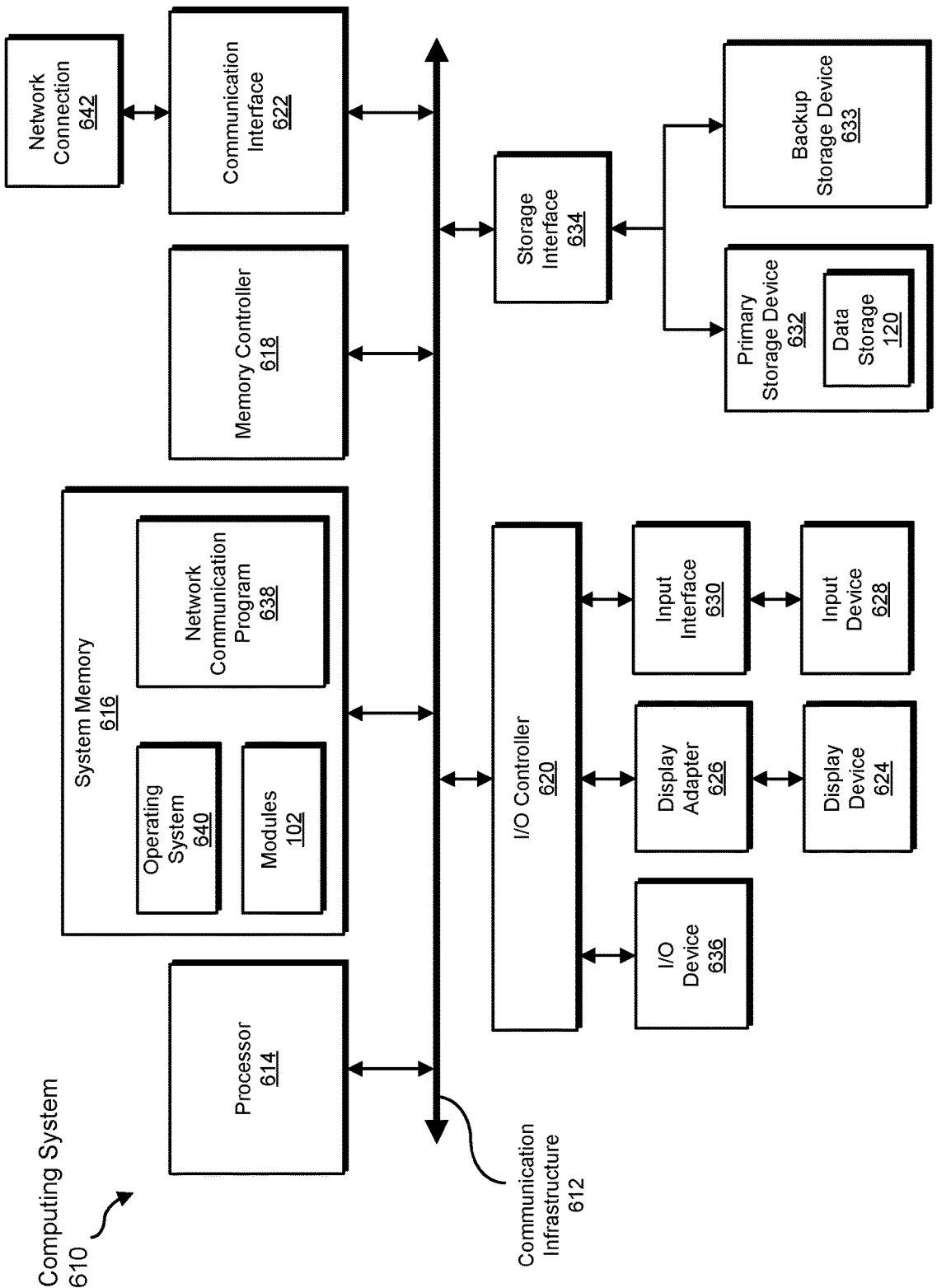
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
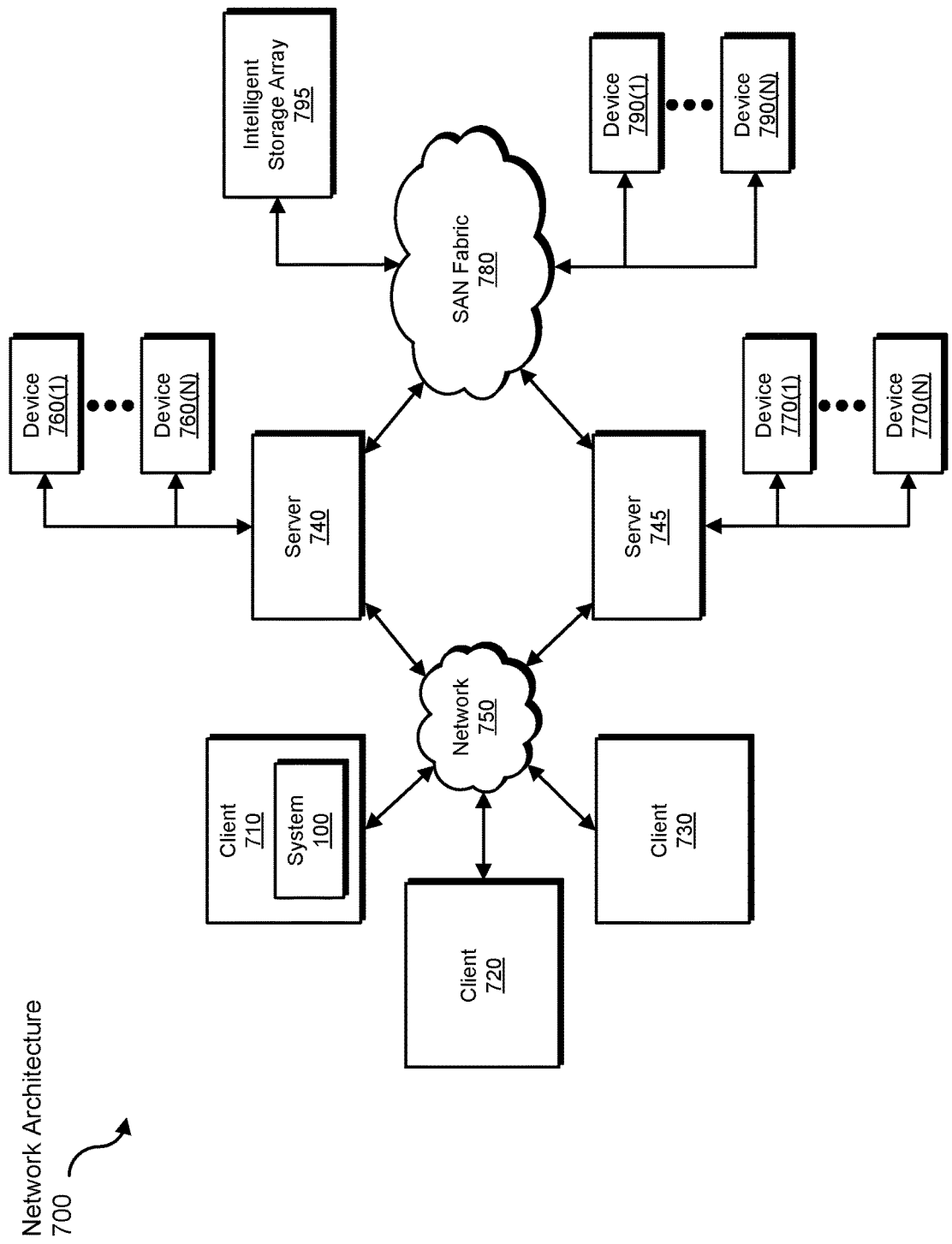
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting user data privacy against anti-tracking evasion techniques for web trackers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting user data privacy against anti-tracking evasion techniques for web trackers, at least a portion of the method being performed by one or more computing devices comprising at least one processor, the method comprising:
    detecting, by the one or more computing devices, hypertext markup language (HTML) associated with a website displayed in a browser application;
    determining, by the one or more computing devices, information describing scripting programming code responsible for embedding HTML elements in the website;
    identifying, by the one or more computing devices, one or more elements of the embedded HTML elements capable of executing web tracking code from the website;
    determining, by the one or more computing devices and based on the information, a presence of a hidden web tracking script, wherein the information indicates the scripting programming code is disguising a domain associated with the identified one or more embedded HTML elements;
    associating, by the one or more computing devices and based on the information, the identified one or more embedded HTML elements with the disguised domain; and
    performing, by the one or more computing devices and based on the associating, a security action that protects against a potential invasion of user data privacy by preventing the identified one or more embedded HTML elements having the hidden web tracking script from executing the web tracking code in the browser application.

2. The computer-implemented method of claim 1, wherein detecting the HTML associated with the website comprises:
    retrieving an HTML document that renders a currently displayed web page on the website; and
    detecting the HTML in the HTML document.

3. The computer-implemented method of claim 1, wherein identifying the HTML capable of executing the web tracking code comprises identifying a script HTML element.

4. The computer-implemented method of claim 1, wherein identifying the HTML capable of executing the web tracking code comprises identifying an inline frame (iframe) HTML element.

5. The computer-implemented method of claim 1, wherein determining the presence of a hidden web tracking script comprises:
    determining that a domain associated with the scripting programming code is unrelated to a domain associated with a web page for the website;
    detecting, further based on the domain associated with the scripting programming code is unrelated to the domain associated with the web page, that the scripting programming code disguised the domain associated with the embedded HTML elements; and
    identifying, in response to the detecting, the scripting programming code as the hidden web tracking script.

6. The computer-implemented method of claim 1, wherein the security action comprises blocking the hidden web tracking script from generating a web tracking identifier.

7. The computer-implemented method of claim 6, wherein the web tracking identifier comprises at least one of:
    a web tracking cookie; or
    a local storage identifier utilized for storing user data.

8. The computer-implemented method of claim 1, wherein the security action comprises blocking the hidden web tracking script from retrieving a programming code function utilized for obtaining private user data.

9. The computer-implemented method of claim 1, wherein the security action comprises modifying execution of the hidden web tracking script to prevent retrieving a programming code function utilized for obtaining private user data.

10. The computer-implemented method of claim 9, wherein modifying execution of the hidden web tracking script to prevent retrieving a programming code function utilized for obtaining private user data comprises replacing a request for retrieving the programming code function with a request for retrieving harmless data.

11. A system for protecting user data privacy against anti-tracking evasion techniques for web trackers, the system comprising:
    at least one physical processor;
    physical memory comprising computer-executable instructions and one or more modules that, when executed by the physical processor, cause the physical processor to:
        detect, by a detection module, hypertext markup language (HTML) associated with a website displayed in a browser application;
        determine, by an identification module, information describing scripting programming code responsible for embedding HTML elements in the website;
        identify, by the identification module, one or more elements of the embedded HTML elements capable of executing web tracking code from the website;
        determine, by a determining module and based on the information, a presence of a hidden web tracking script, wherein the information indicates the scripting programming code is disguising a domain associated with the identified one or more embedded HTML elements;
        associate, by the determining module and based on the information, the identified one or more embedded HTML elements with the disguised domain; and
        perform, by a security module and based on the associating, a security action that protects against a potential invasion of user data privacy by preventing the identified one or more embedded HTML elements having the hidden web tracking script from executing the web tracking code in the browser application.

12. The system of claim 11, wherein detection module detects the HTML associated with the website by:
    retrieving an HTML document that renders a currently displayed web page on the website; and
    detecting the HTML in the HTML document.

13. The system of claim 11, wherein the identification module identifies the HTML capable of executing the web tracking code by identifying a script HTML element.

14. The system of claim 11, wherein the identification module identifies the HTML capable of executing the web tracking code by identifying an inline frame (iframe) HTML element.

15. The system of claim 11, wherein the determining module determines the presence of a hidden web tracking script by:
  determining that a domain associated with the scripting programming code is unrelated to a domain associated with a web page for the website;
  detecting, further based on the domain associated with the scripting programming code is unrelated to the domain associated with the web page, that the scripting programming code disguised the domain associated with the embedded HTML elements; and
  identifying, in response to the detecting, the scripting programming code as the hidden web tracking script.

16. The system of claim 11, wherein the security module performs the security action by blocking the hidden web tracking script from generating a web tracking identifier.

17. The system of claim 16, wherein the web tracking identifier comprises at least one of:
  a web tracking cookie; or
  a local storage identifier utilized for storing user data.

18. The system of claim 11, wherein the security module performs the security action by blocking the hidden web tracking script from retrieving a programming code function utilized for obtaining private user data.

19. The system of claim 11, wherein the security module performs the security action by modifying execution of the hidden web tracking script to prevent retrieving a programming code function utilized for obtaining private user data.

20. A non-transitory computer-readable medium comprising one or more computer-executable instructions that, when executed by at least one processor of a computing device, cause the computing device to:
  detect hypertext markup language (HTML) associated with a website displayed in a browser application;
  determine information describing scripting programming code responsible for embedding HTML elements in the website;
  identify one or more elements of the embedded HTML elements capable of executing web tracking code from the website;
  determine, based on the information, a presence of a hidden web tracking script, wherein the information indicates the scripting programming code is disguising a domain associated with the identified one or more embedded HTML elements;
  associate, based on the information, the identified one or more embedded HTML elements with the disguised domain; and
  perform, based on the associating, a security action that protects against a potential invasion of user data privacy by preventing the identified one or more embedded HTML elements having the hidden web tracking script from executing the web tracking code in the browser application.

* * * * *